United States Patent
Torii

(10) Patent No.: US 8,038,201 B2
(45) Date of Patent: Oct. 18, 2011

(54) VEHICLE BODY STRUCTURE

(75) Inventor: Nobuyuki Torii, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/812,041

(22) PCT Filed: Feb. 5, 2009

(86) PCT No.: PCT/JP2009/051965
§ 371 (c)(1),
(2), (4) Date: Jul. 8, 2010

(87) PCT Pub. No.: WO2009/104481
PCT Pub. Date: Aug. 27, 2009

(65) Prior Publication Data
US 2010/0276960 A1    Nov. 4, 2010

(30) Foreign Application Priority Data

Feb. 18, 2008  (JP) ................................. 2008-036218

(51) Int. Cl.
*B60N 99/00* (2006.01)
(52) U.S. Cl. ............... 296/187.12; 296/193.05; 296/68.1
(58) Field of Classification Search .................. 296/68.1, 296/187.03, 187.08, 187.12, 193.05, 193.07, 296/203.01
See application file for complete search history.

(56) References Cited

U.S. PATENT DOCUMENTS

| | | | | |
|---|---|---|---|---|
| 5,388,885 A | * | 2/1995 | Warren | 296/203.03 |
| 5,954,390 A | * | 9/1999 | Kleinhoffer et al. | 296/203.01 |
| 6,568,745 B2 | * | 5/2003 | Kosuge et al. | 296/193.02 |
| 7,237,833 B1 | * | 7/2007 | Moll | 296/204 |
| 7,448,674 B2 | * | 11/2008 | Brunner et al. | 296/193.02 |
| 2006/0202513 A1 | | 9/2006 | Matsuda | |

FOREIGN PATENT DOCUMENTS

| | | |
|---|---|---|
| JP | 2003 312340 | 11/2003 |
| JP | 2006 205767 | 8/2006 |
| JP | 2006 248388 | 9/2006 |
| JP | 2007 326440 | 12/2007 |

OTHER PUBLICATIONS

English Translation of the International Preliminary Report on Patentability (IPRP-Chapter 2) issued Oct. 14, 2010 in PCT/JP2009/051965 filed Feb. 5, 2009.

* cited by examiner

*Primary Examiner* — Joseph Pape
(74) *Attorney, Agent, or Firm* — Oblon, Spivak, McClelland, Maier & Neustadt, L.L.P.

(57) ABSTRACT

Provided is a vehicle body structure which can prevent a door from entering a vehicle interior by preventing deformation of a beam extending in a vehicle width direction in a seat of a vehicle even when a side collision has occurred in the vehicle. In the vehicle body structure, a seat leg is placed above a cross member and fixed to the cross member. Additionally, a pair of seat legs is arranged on the right and left sides, and the seat legs are interconnected by a rod member. A beam is coupled with an upper end of the seat leg. The side of the beam protrudes to the outer side of the seat leg in the width direction of the vehicle, and a portion protruding outside of the seat leg is a protruding portion. A load transmission member having a length in the vehicle width direction substantially equal to the length of the protruding portion of the beam is arranged on the side of the seat leg.

10 Claims, 3 Drawing Sheets

(a) Related Art (b)

VEHICLE BODY STRUCTURE

TECHNICAL FIELD

The present invention relates to a vehicle body structure, and specifically, to a vehicle body structure including a beam disposed at a lower position of a seat in a vehicle body, and a seat attaching portion to which the beam is attached.

BACKGROUND ART

A beam disposed along the width direction of a vehicle is provided at a lower position of a seat in the vehicle. The seat in the vehicle is connected to a vehicle body frame as the beam is coupled with an upper position of a vehicle attaching portion. As a vehicle having such a vehicle body structure, a seat for an automobile which transmits a collision load to be input to a vehicle door due to a side collision to a floor via an arm and a seat attaching portion which extend in a vehicle width direction below the seat is conventionally known (for example, Patent Citation 1). In this seat for an automobile, a plurality of seat-side reinforcing members that extend in the vehicle width direction is provided. An end of each seat-side reinforcing member is formed so as to protrude from a seat cushion, and the seat-side reinforcing member is connected to and supported by a strength member which extends between the ends of the plurality of seat-side reinforcing members in the front-back direction of the automobile.

CITATION LIST

Patent Citation 1 JP 2003-312340 A

SUMMARY OF INVENTION

Technical Problem

However, in the seat for an automobile disclosed in the above Patent Citation 1, bending deformation tends to occur in the seat-side reinforcing members since a collision load is directly input to the seat-side reinforcing members when a side collision has occurred in the vehicle. When bending deformation occurs in the seat-side reinforcing members (beams), there is a problem in that the extent to which a door, which has deformed due to a side collision, enters into a vehicle interior will increase.

Thus, the object of the invention is to provide a vehicle body structure which can prevent a door from entering a vehicle interior by preventing deformation of a beam extending in a vehicle width direction in a seat of a vehicle even when a side collision has occurred in the vehicle.

Technical Solution

A vehicle body structure related to the invention which has solved the above problem includes a seat attaching portion to which a seat in a vehicle is to be attached. A beam disposed along a width direction in the vehicle and having a protruding portion which protrudes to the outer side of the seat attaching portion in the width direction of the vehicle is coupled with an upper position of the seat attaching portion. A load transmission member which is arranged on a side of the seat attaching portion to transmit a collision load to be input to a door in the vehicle to the seat attaching portion is provided.

In the vehicle body structure related to the invention, a beam having a protruding portion which protrudes to the outer side of the seat attaching portion in the width direction of the vehicle is coupled with an upper position of the seat attaching portion. Here, when bending deformation occurs in the beam in a case where a side collision has occurred in the vehicle, a load input from the beam becomes a moment load and is transmitted to the seat attaching portion. Thus, a load applied to the seat attaching portion will increase, and the degree to which the door enters will increase. In this regard, in the vehicle body structure related to the invention, a load transmission member which is arranged on a side of the seat attaching portion to transmit a collision load to be input to a door in the vehicle to the seat attaching portion is provided. Since a load when a side collision has occurred is transmitted even to the seat attaching portion via the load transmission member by providing this load transmission member, bending deformation of the beam can be prevented. Accordingly, it is possible to prevent a door from entering a vehicle interior by preventing deformation of a beam extending in a vehicle width direction in a seat of a vehicle even when a side collision has occurred in the vehicle.

Here, an aspect can be adopted in which the seat attaching portion is disposed on a cross member provided in the vehicle.

By disposing the seat attaching portion on the cross member, a load input to the seat attaching portion can be directly transmitted to the cross member. As a result, movement or damage of the seat attaching portion can be appropriately prevented, and it is possible to contribute to the prevention of deformation of the beam.

Here, an aspect can be adopted in which a protruding length of the protruding portion in the beam is made substantially equal to the length of the load transmission member in the width direction of the vehicle.

By making the protruding length of the protruding portion in the beam substantially equal to the length of the load transmission member in the width direction of the vehicle, a load to be input when a side collision has occurred can be substantially uniformly distributed between the beam and the load transmission member. As a result, movement or damage of the seat attaching portion, and deformation of the beam can be more appropriately prevented.

Moreover, an aspect can be adopted in which a door member is disposed outside the seat member in the width direction of the vehicle, and a pad member with a height including a height position where the beam and the load transmission member are disposed is provided at the door member.

By providing a pad member with a height including a height position where the beam and the load transmission member are disposed at the door member, a load to be input when a side collision has occurred can be more uniformly distributed between the beam and the load transmission member. As a result, movement or damage of the seat attaching portion, and deformation of the beam can be more appropriately prevented.

Advantageous Effects

According to the vehicle body structure related to the invention, it is possible to prevent a door from entering a vehicle interior by preventing deformation of a beam extending in a vehicle width direction in a seat of a vehicle even when a side collision has occurred in the vehicle.

EXPLANATION OF REFERENCES

Figure 1:
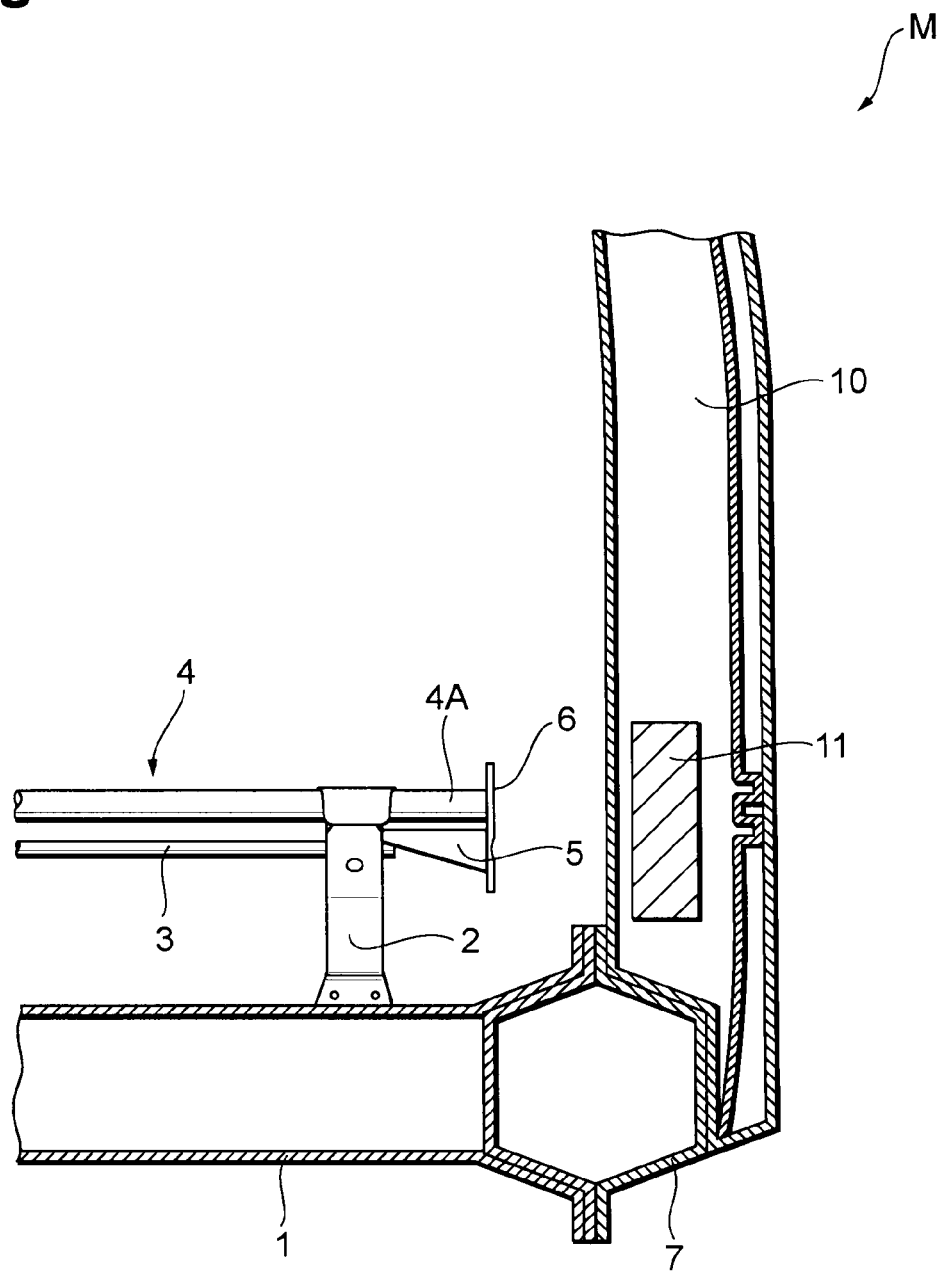
FIG. 1 is a front sectional view of a vehicle body related to an embodiment of the invention.

1: cross member, 2: seat leg, 3: rod member, 4: beam, 4A: protruding portion, 5: load transmission member, 6: plate-shaped member, 7: side member, 10: door member, 11: pad member, M: vehicle

DESCRIPTION OF EMBODIMENTS

An embodiment of the invention will now be described with reference to the accompanying drawings. In addition, in the description of the drawings, the same reference numerals will be given to the same elements, and duplicate description will be omitted. Additionally, for convenience of illustration, the ratios of dimensions in the drawings do not necessarily coincide with those described.

FIG. 1 is a front sectional view of a vehicle body related to the embodiment of the invention. As shown in FIG. 1, the vehicle body related to the present embodiment includes a cross member 1. A seat leg 2 which becomes a seat attaching portion is placed above the cross member 1 and fixed to the cross member 1. Additionally, a pair of seat legs 2 is arranged on the right and left sides (one side is not shown), and the seat legs 2 are interconnected by a rod member 3.

Moreover, a beam 4 is coupled with an upper end equivalent to an upper position of the seat leg 2. The beam 4 is connected to each of the pair of seat legs 2. Additionally, the side of the beam 4 protrudes to the outer side of the seat leg 2 in the width direction of a vehicle M, and a portion protruding outside of the seat leg 2 is a protruding portion 4A.

Additionally, a load transmission member 5 is disposed on a side of the seat leg 2. The load transmission member 5 is arranged at a position right below the beam 4, and the length of the vehicle M in the width direction is made substantially equal to the length of the protruding portion 4A of the beam 4. The load transmission member 5 has a side geometry which becomes wider toward the outside from the inside. Moreover, the end of the protruding portion 4A in the beam 4 and the end of the load transmission member 5 are connected to a plate-shaped member 6, respectively.

Additionally, a side member 7 is connected to an end of the cross member 1, and a door member 10 is disposed outside the seat leg 2 in the width direction of the vehicle M. A pad member 11 is disposed inside the door member 10. The pad member 11 is arranged at a height position including a height position where the beam 4 and the load transmission member 5 are disposed.

Figure 2:
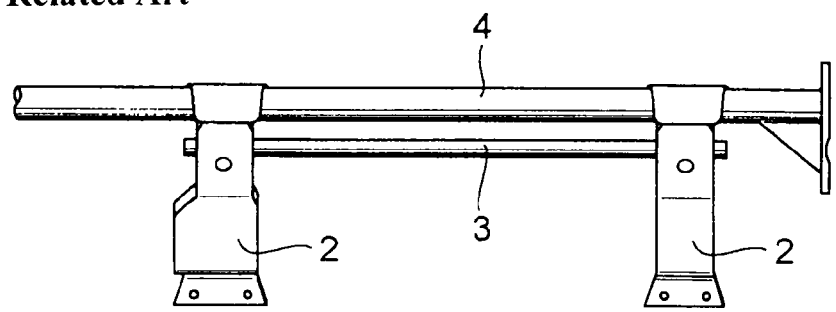
FIG. 2A is a front view of main parts of a vehicle body structure related to a existing example.
FIG. 2B is a front view of main parts of a vehicle body structure related to the present embodiment.
Figure 2:
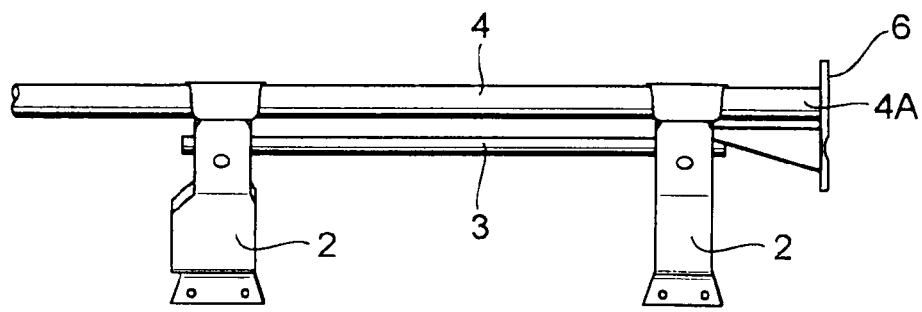

Next, the operational effects of the vehicle body structure related to the present embodiment will be described. A case where another vehicle has made a side collision with a vehicle including the vehicle body structure related to the present embodiment will be discussed. At this time, when the other vehicle collides with the door member 10 of a vehicle from the side of the vehicle, a load from the other vehicle is transmitted to the beam 4 via the door member 10. At this time, as shown in FIG. 2A in an existing vehicle body structure in which the load transmission member is not provided, a load from the other vehicle is transmitted to the beam 4. When a load is transmitted to the beam 4, the load is transmitted to the seat leg 2 via the beam 4, and is transmitted to the cross member 1. At this time, since the load input to the beam 4 is large, the possibility that bending deformation will occur increases at the beam 4. When the bending deformation occurs in the beam 4, since a moment load is input to the seat leg 2, the possibility that the seat leg 2 will be moved or damaged becomes high.

In this regard, in the vehicle body structure related to the present embodiment, as shown in FIG. 2B, the load transmission member 5 is interposed at the side of the seat leg 2. As the load transmission member 5 is interposed, a load when the other vehicle has made a side collision is distributed to the beam 4 and the load transmission member 5. As a result, the bending deformation of the beam 4 is prevented. Additionally, although the load input to the load transmission member 5 is transmitted to the seat leg 2, a load applied to the seat leg 2 is received by an axial force. Additionally, although a load is transmitted to the seat leg 2 via the beam 4, the load is also received by an axial force. Accordingly, since most of the load applied to the seat leg 2 can be received by an axial force, movement, damage, etc. of the seat leg 2 can be appropriately prevented. As a result, the door member 10 can be appropriately prevented from entering the vehicle interior.

Figure 3:
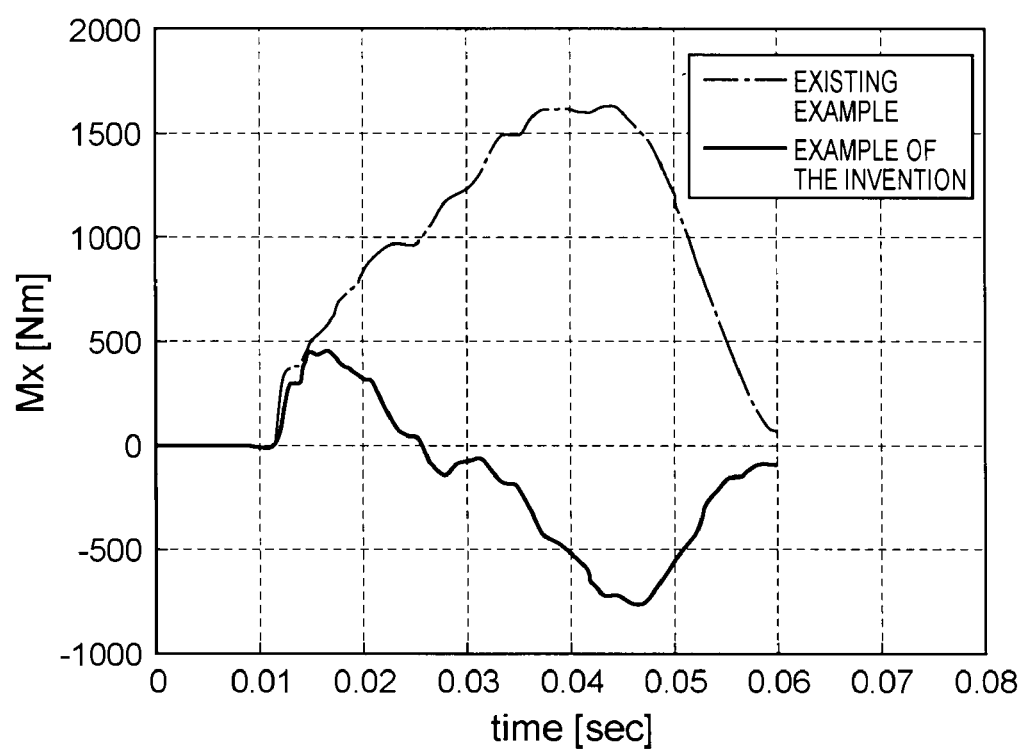
FIG. 3 is a graph showing experimental results.

Here, an experiment in which a moment applied to the cross member 1 when a side collision has occurred is measured was conducted using the existing vehicle body structure shown in FIG. 2A, and the vehicle body structure related to the present embodiment shown in FIG. 2B. The results are shown in FIG. 3. As shown in FIG. 3, the tendency that a load applied to the cross member 1 increases after a side collision has occurred was observed in the existing vehicle body structure. However, the tendency that a load applied to the cross member 1 first increases slightly, but decreases immediately was observed in the vehicle body structure related to the present embodiment. In this way, in the vehicle body structure related to the present embodiment, the load applied to the cross member 1 can be reduced. Thus, movement, damage, etc. of the seat leg 2 can be appropriately prevented.

Additionally, in the vehicle body structure related to the present embodiment, the seat leg 2 is provided at the cross member 1. Thus, the load input to the seat leg 2 can be directly transmitted to the cross member 1. As a result, movement or damage of the seat leg 2 can be appropriately prevented.

Moreover, in the vehicle body structure related to the present embodiment, the length of the protruding portion 4A of the beam 4 is made substantially equal to the length of the load transmission member 5 in the width direction of the vehicle. For this reason, a load to be input when a side collision has occurred can be substantially uniformly distributed between the beam 4 and the load transmission member 5. As a result, movement or damage of the seat leg 2, and deformation of the beam can be more appropriately prevented.

Moreover, in the vehicle body structure related to the present embodiment, the pad member 11 is disposed at the door member 10, and the pad member 11 has a height position including a height position where the beam 4 and the load transmission member 5 are disposed. For this reason, a load to be input when a side collision has occurred can be more uniformly distributed between the beam 4 and the load transmission member 5. As a result, movement or damage of the seat leg 2, and deformation of the beam can be more appropriately prevented.

Although the preferred embodiment of the invention has been described, the invention is not limited to the above embodiment. For example, in the above embodiment, the load transmission member 5 is arranged at a position right below the beam 4. However, an aspect can be adopted in which the load transmission member 5 is arranged at a position separated from the beam 4.

Additionally, the shape of the load transmission member 5 is not particularly limited, and a pipe-shaped or plate-shaped load transmission member with a circular or polygonal cross-section can be used. Moreover, in the above embodiment, the end of the beam 4 and the end of the load transmission member 5 are connected to the plate-shaped member. However, an aspect can be adopted in which neither are connected but separated. Additionally, in the above embodiment, the load transmission member 5 has a side geometry which becomes wider toward the outside from the inside. The side geometry is not particularly limited, and can be a rectangular shape which always has a constant width toward the outside from the inside. Needless to say, other shapes can be adopted.

INDUSTRIAL APPLICABILITY

According to the vehicle body structure related to the invention, it is possible to prevent the door from entering the vehicle interior by preventing deformation of the beam extending in the vehicle width direction in the seat of the vehicle even when the side collision has occurred in the vehicle.

The invention claimed is:

1. A vehicle body structure comprising:
   a seat attaching portion to which a seat in a vehicle is to be attached;
   a door member disposed outside the seat attaching portion in a width direction of the vehicle;
   a beam disposed along the width direction of the vehicle and coupled with an upper portion of the seat attaching portion, the beam including a protruding portion that protrudes from the seat attaching portion toward the door member in the width direction of the vehicle; and
   a load transmission member that transmits a collision load from the door member to the seat attaching portion, the load transmission member being attached to a side portion of the seat attaching portion.

2. The vehicle body structure according to claim 1, further comprising:
   a cross member of the vehicle that attaches to a lower portion of the seat attaching portion.

3. The vehicle body structure according to claim 1,
   wherein a length of the protruding portion of the beam is substantially equal to a length of the load transmission member in the width direction of the vehicle.

4. The vehicle body structure according to claim 1,
   wherein the door member includes a pad member disposed at a position in a vehicle height direction that corresponds to a position of the beam in the vehicle height direction.

5. The vehicle body structure according to claim 1, wherein the seat attaching portion is a first seat attaching portion,
   the vehicle body structure further includes a second seat attaching portion disposed inside the first seat attaching portion in the vehicle width direction, and
   the first seat attaching portion is connected to the second seat attaching portion by a rod member.

6. The vehicle body structure according to claim 1, wherein the load transmission member includes a first end attached to the seat attaching portion and a second end disposed toward the door member in the vehicle width direction.

7. The vehicle body structure according to claim 6, further comprising:
   a plate-shaped member attached to an end of the beam disposed toward the door member and also attached to the second end of the load transmission member.

8. The vehicle body structure according to claim 7, wherein the door member includes a pad member disposed at a position in a vehicle height direction that corresponds to a position of the plate-shaped member in the vehicle height direction.

9. The vehicle body structure according to claim 1, wherein the load transmission member is disposed below the beam in a vehicle height direction.

10. The vehicle body structure according to claim 2, wherein the collision load is transmitted from the seat attaching member to the cross member.

* * * * *